(No Model.) 3 Sheets—Sheet 1.

R. DAHLSTRÖM.
MACHINE FOR CUTTING NAILS.

No. 347,923. Patented Aug. 24, 1886.

Witnesses.
Inventor:

(No Model.)  3 Sheets—Sheet 2.

R. DAHLSTRÖM.

MACHINE FOR CUTTING NAILS.

No. 347,923.  Patented Aug. 24, 1886.

(No Model.) 3 Sheets—Sheet 3.
R. DAHLSTRÖM.
MACHINE FOR CUTTING NAILS.
No. 347,923. Patented Aug. 24, 1886.
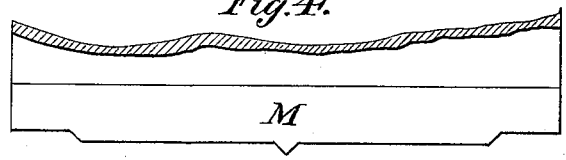
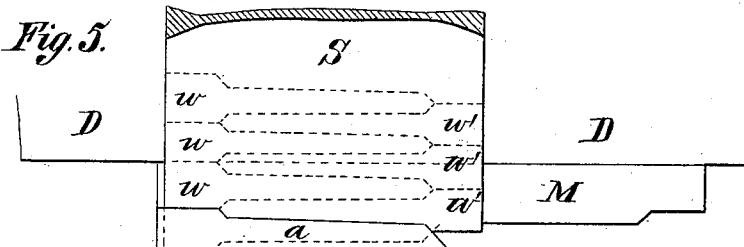
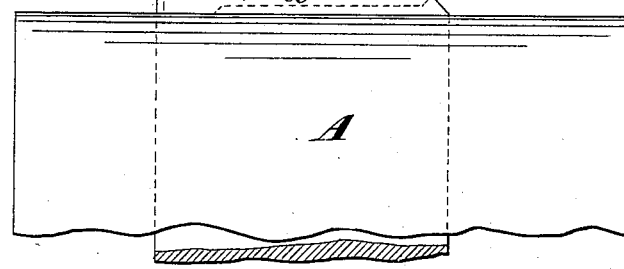
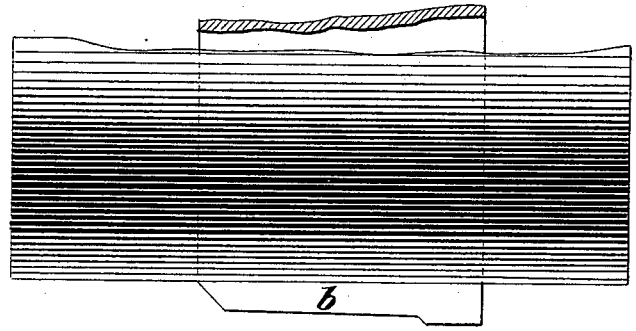
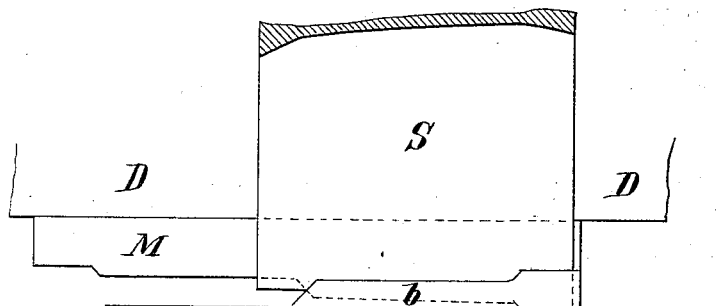

UNITED STATES PATENT OFFICE.

ROBERT DAHLSTRÖM, OF HAMBURG, GERMANY.

MACHINE FOR CUTTING NAILS.

SPECIFICATION forming part of Letters Patent No. 347,923, dated August 24, 1886.

Application filed January 2, 1886. Serial No. 187,342. (No model.)

*To all whom it may concern:*

Be it known that I, ROBERT DAHLSTRÖM, a subject of the King of Sweden, residing at Hamburg, in the German Empire, have invented a new and Improved Machine for Cutting Horseshoe-Nail Blanks, of which the following is a specification, reference being had to the accompanying drawings.

This invention is applicable to machines for cutting or dividing iron or steel bars transversely to form horseshoe-nail blanks, the length of which extends transversely of the bar. These bars are thickest at the longitudinal sides or edges, to allow of the necessary material for manufacture of the heads of the nails.

The invention relates to machines for the purpose above referred to, comprising a rotary cutter-head having secured within it cutters of reverse profile and a longitudinally-movable cutter, which is usually fitted in a slide having a reciprocating motion parallel with the axis of the rotary cutter-head, and which has a profile corresponding with both the said rotary cutters alternately.

One feature of my invention consists in the combination of a rotary cutter-head and its cutters of reverse profile, a longitudinally-movable slide, and a cutter carried by the slide and having a profile to correspond with both the rotating cutters alternately, the said cutter carried by the slide having an inclination downward and forward toward the top of the rotating cutter-head, so as to afford clearance for the blanks as they are cut from the bar to pass between the cutter carried by said slide and the cutter-head.

Another feature of the invention consists in the combination, with a cutter-head and its cutters and a longitudinally-movable cutter, of guides arranged one above another, and in which a bar from which nail-blanks are to be cut may be held in a substantially upright position and fed downward by gravity.

Figure 1:
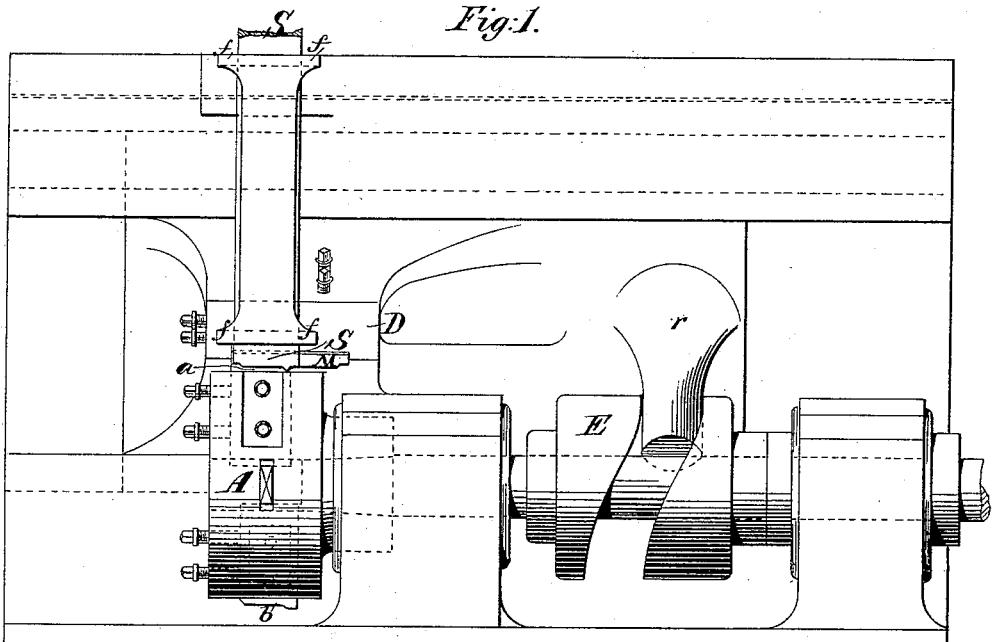
Figure 3:
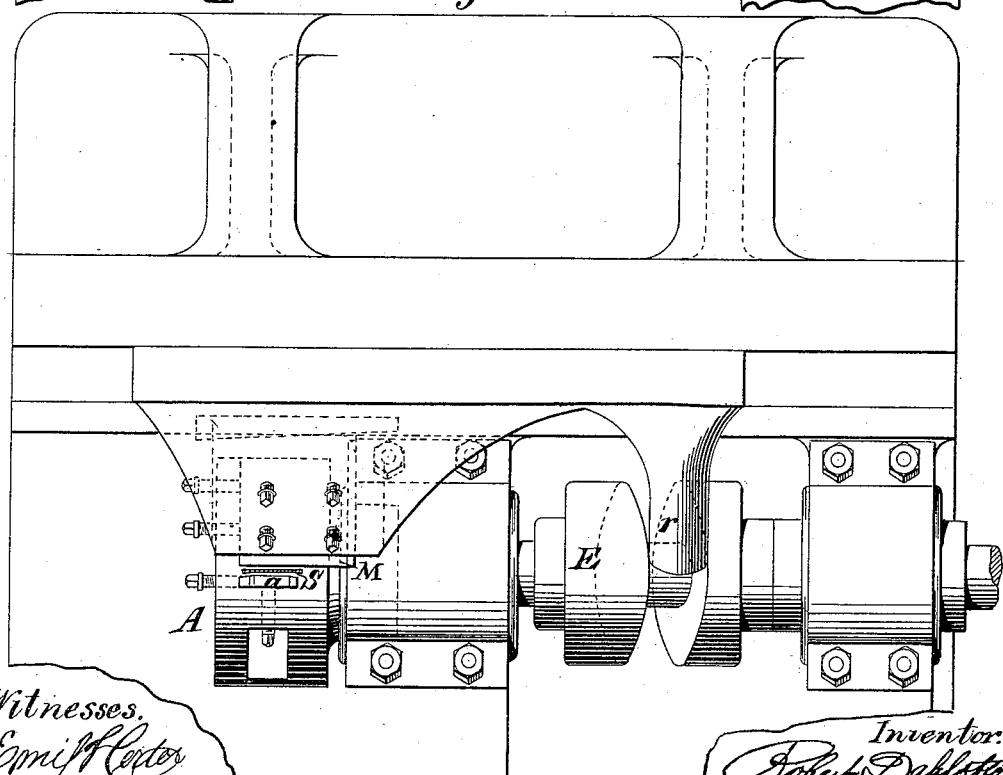
Figure 2:
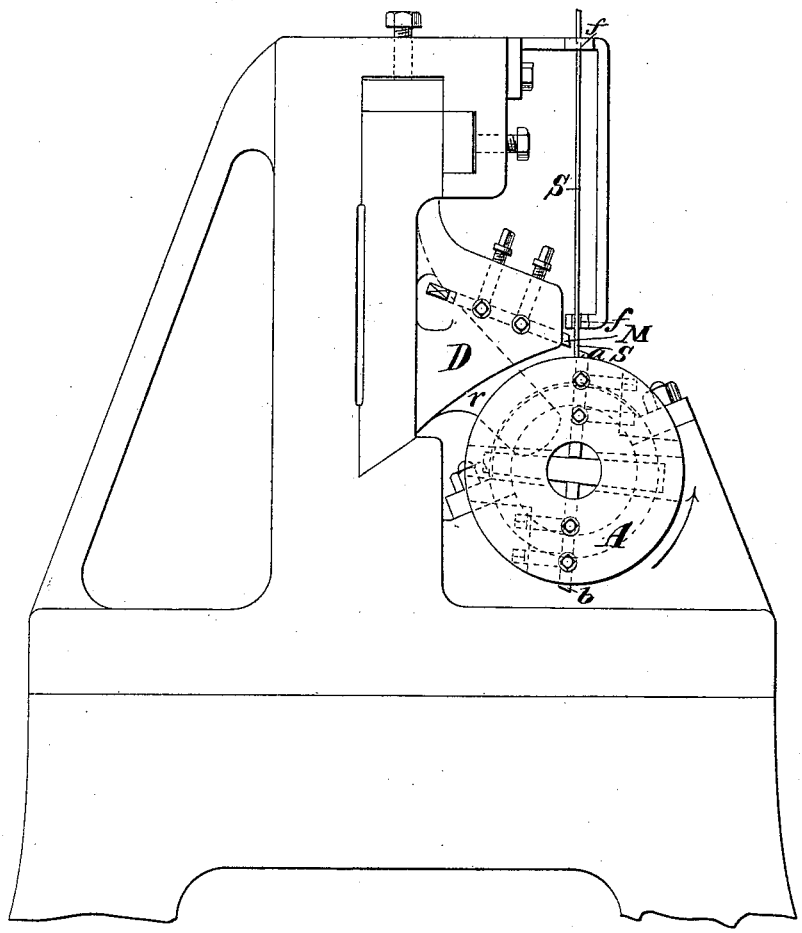

The machine is illustrated by the accompanying sheet of drawings, of which Figure 1 represents a longitudinal view, Fig. 2 a front view, and Fig. 3 a ground plan, of the machine. Figs. 4, 5, and 6 are (on enlarged scale) representations of detached parts of the machine, showing the movable knife and the revolving cutter-head.

On the frame of the machine are brackets supporting the shaft of the revolving cutter-head A, which head A carries two adjustable cutters, $a$ and $b$, having reversed profiles, one of which, $a$, cuts off the blanks $w$, said blanks having the head part to the left when cut off, while the other cutter, $b$, cuts off the opposite blanks, $w'$. The bar, S, from which the blanks are cut off rests upon the surface of head A, and is kept in place for cutting between vertical guides $f$, as will be understood from Figs. 1 and 2 of the drawings. The bar S therefore feeds automatically downward by gravity and without any manual labor. Opposite the guides $ff$ is a sliding carriage, D, that carries a cutter, M, having a profile as shown in Fig. 4. This support D slides to and fro from the left to the right in such manner that the cutter M has a longitudinal movement, and that during the cutting action of cutter $a$ the said cutter M is at the right-hand side, but during the action of the cutter $b$ is at the left-hand side. In the first case the profile of the left-hand half of the length of M corresponds to the shape of cutter $a$. In the other case the right-hand half thereof corresponds to the cutter $b$. The result is, that during the rotation of the cutter-head A a blank, $w$, and a blank, $w'$, are alternately cut off from bar S.

As best shown in Fig. 2, the cutter M is so secured in the slide D that it is inclined downward and forward toward its cutting-edge, which is above the rotary cutter-head, and hence ample clearance is afforded between it and the rotary head for the passage of the blanks as they are cut off from the bar S.

The sliding motion of the carriage D is, according to the illustration, produced by a cam, E, and arm $r$; but an eccentric or other known convenient mechanical appliance may be used for giving the specified motion.

Having now particularly described and ascertained the nature and particulars of my said invention, and in what manner the same is to be performed, I declare that what I claim is—

1. In a machine for cutting horseshoe-nail blanks, the combination of the rotary cutter-head A and its cutters $a$ $b$, of reverse profile, the longitudinally-movable slide D, and the cutter M, carried by the slide, and having a profile corresponding with both the rotating cutters *a* and *b* alternately, the cutter M having an inclination downward and forward toward the top of the rotating cutter-head, so as to afford clearance for the blanks between it and the cutter-head, substantially as herein described.

2. In a machine for cutting horseshoe-nail blanks, the combination of a rotary cutter-head, A, and its cutters *a b*, of reverse profile, the longitudinally-movable cutter M, having a profile to correspond with said rotating cutters *a* and *b*, alternately, and guides *f*, arranged one above another, and in which a bar from which nail-blanks are to be cut may be held in a substantially upright position and fed downward by gravity, substantially as herein described.

ROBERT DAHLSTRÖM.

Witnesses:
F. ENGEL,
H. E. WISS.